United States Patent
Samset et al.

(10) Patent No.: US 10,402,969 B2
(45) Date of Patent: Sep. 3, 2019

(54) METHODS AND SYSTEMS FOR MODEL DRIVEN MULTI-MODAL MEDICAL IMAGING

(71) Applicant: General Electric Company, Schenectady, NY (US)

(72) Inventors: Eigil Samset, Oslo (NO); Olivier Gerard, Horten (NO); Stian Langeland, Horten (NO)

(73) Assignee: General Electric Company, Schenectady, NY (US)

( * ) Notice: Subject to any disclaimer, the term of this patent is extended or adjusted under 35 U.S.C. 154(b) by 148 days.

(21) Appl. No.: 15/455,391

(22) Filed: Mar. 10, 2017

(65) Prior Publication Data
US 2018/0260950 A1    Sep. 13, 2018

(51) Int. Cl.
*G06K 9/00*    (2006.01)
*G06T 7/00*    (2017.01)
*G06T 7/33*    (2017.01)
*G06T 11/00*   (2006.01)

(52) U.S. Cl.
CPC ............ *G06T 7/0012* (2013.01); *G06T 7/344* (2017.01); *G06T 11/008* (2013.01); *G06T 2207/10081* (2013.01); *G06T 2207/10088* (2013.01); *G06T 2207/10104* (2013.01); *G06T 2207/10116* (2013.01); *G06T 2207/10132* (2013.01); *G06T 2207/30008* (2013.01); *G06T 2207/30016* (2013.01); *G06T 2207/30048* (2013.01); *G06T 2207/30056* (2013.01); *G06T 2207/30084* (2013.01)

(58) Field of Classification Search
None
See application file for complete search history.

(56) References Cited

U.S. PATENT DOCUMENTS

| | | | |
|---|---|---|---|
| 7,117,026 B2 * | 10/2006 | Shao | G06T 7/20 600/411 |
| 8,090,165 B2 | 1/2012 | Jiang et al. | |
| 2006/0253031 A1 * | 11/2006 | Altmann | G06T 7/38 600/466 |
| 2008/0085042 A1 * | 4/2008 | Trofimov | A61B 5/042 382/128 |
| 2009/0097722 A1 * | 4/2009 | Dekel | G06T 15/10 382/128 |

(Continued)

OTHER PUBLICATIONS

Hu, Yipeng, et al. "MR to ultrasound registration for image-guided prostate interventions." Medical image analysis 16.3 (2012): 687-703. (Year: 2012).*

(Continued)

*Primary Examiner* — Samah A Beg
(74) *Attorney, Agent, or Firm* — Dean D. Small; The Small Patent Law Group, LLC

(57) ABSTRACT

Systems and methods are provided for a visualization of a multi-modal medical image for diagnostic medical imaging. The systems and methods receive first and second image data sets of an anatomical structure of interest, register the first and second image data sets to a geometrical model of the anatomical structure of interest to form a registered image. The geometrical model includes a location of an anatomical marker. The systems and methods further display the registered image.

20 Claims, 5 Drawing Sheets

(56) References Cited

U.S. PATENT DOCUMENTS

| | | | |
|---|---|---|---|
| 2009/0097723 A1* | 4/2009 | Washburn | A61B 8/06 382/128 |
| 2010/0195881 A1 | 8/2010 | Orderud et al. | |
| 2010/0254583 A1* | 10/2010 | Chan | A61B 6/503 382/131 |
| 2012/0245458 A1* | 9/2012 | Gogin | A61B 6/00 600/424 |
| 2013/0294667 A1* | 11/2013 | Zheng | G06T 7/0012 382/131 |
| 2013/0338496 A1* | 12/2013 | Hielscher | A61B 5/0064 600/425 |
| 2014/0206994 A1* | 7/2014 | Jain | A61B 6/12 600/437 |
| 2015/0042646 A1* | 2/2015 | Comaniciu | G06T 17/20 345/420 |
| 2015/0043794 A1* | 2/2015 | Tahmasebi Maraghoosh | G06T 7/33 382/128 |
| 2015/0110373 A1* | 4/2015 | Shaham | G06T 7/0081 382/131 |
| 2015/0185846 A1* | 7/2015 | Otto | G06F 3/016 345/156 |
| 2015/0347709 A1* | 12/2015 | Mansi | G06T 7/12 703/11 |
| 2016/0030008 A1* | 2/2016 | Gerard | A61B 8/5261 600/440 |
| 2016/0078615 A1* | 3/2016 | Zhan | G06T 7/11 382/128 |
| 2016/0078633 A1* | 3/2016 | Tahmasebi Maraghoosh | G06T 17/20 382/131 |
| 2016/0217560 A1* | 7/2016 | Tahmasebi Maraghoosh | A61B 5/0035 |
| 2017/0249737 A1* | 8/2017 | Piron | A61B 6/032 |
| 2017/0337682 A1* | 11/2017 | Liao | G06T 7/30 |
| 2018/0174300 A1* | 6/2018 | Han | G06T 7/11 |
| 2018/0263707 A1* | 9/2018 | Sela | A61B 34/20 |
| 2018/0268541 A1* | 9/2018 | Kruecker | G06T 7/0002 |

OTHER PUBLICATIONS

Sun, Wenhong, Weidong Zhou, and Mingqiang Yang. "Medical image registration using thin-Plate spline for automatically detecting and matching of point sets." Bioinformatics and Biomedical Engineering,(iCBBE) 2011 5th International Conference on. IEEE, 2011. (Year: 2011).*

Lange, Thomas, et al. "Augmenting intraoperative 3D ultrasound with preoperative models for navigation in liver surgery." International Conference on Medical Image Computing and Computer-Assisted Intervention. Springer, Berlin, Heidelberg, 2004. (Year: 2004).*

* cited by examiner

METHODS AND SYSTEMS FOR MODEL DRIVEN MULTI-MODAL MEDICAL IMAGING

FIELD

Embodiments described herein generally relate to providing a visualization of a multi-modal medical image for medical imaging.

BACKGROUND OF THE INVENTION

Image registration finds wide application in medical imaging. Image registration typically entails finding a geometric transform that non-ambiguously links locations and orientations of the same objects or parts thereof in different images. More particularly, image registration includes transforming the different sets of image data to a common coordinate space. The images may be obtained by different imaging devices or alternatively by the same imaging device but at different imaging sessions or time points. As will be appreciated, in the field of medical imaging, there has been a steady increase in the number of imaging sessions or scans a patient undergoes. Images of a body part may be obtained temporally from the same imaging modality or system. Alternatively, in multi-modal imaging, images of the same body parts may be captured via use of different imaging modalities such as a radiological imaging by an X-ray imaging system (e.g., a computed tomography (CT) imaging system), a magnetic resonance (MR) imaging system, an ultrasound imaging system or a positron emission tomography (PET) imaging system, and/or the like.

Lack of explicit image registration when comparing different images relies on human interpretation and mental rotations, which result in miss-communication and difficult navigation for clinicians using the unregistered images. For example, cardiologists trained in echocardiography and cardiologists or surgeons trained in X-ray guided procedures have different perspectives and languages related to imaging and image-guidance. Based on the different perspectives, clinicians must manually find the best views and/or slices for certain anatomical structures for a procedures.

BRIEF DESCRIPTION OF THE INVENTION

In an embodiment, a method (e.g., for multi-modal imaging) is provided. The method includes receiving first and second image data sets of an anatomical structure of interest, registering the first and second image data sets to a geometrical model of the anatomical structure of interest to form a registered image. The geometrical model includes a location of an anatomical marker. The method further includes displaying the registered image.

In an embodiment, a system (e.g., a multi-modal imaging system) is provided. The system includes a display and a memory configured to store first and second image data sets and a geometrical model. The geometrical model includes a location of an anatomical marker of an anatomical structure of interest. The system includes one or more processors configured to execute the programmed instructions stored in the memory. The one or more processors when executing the programmed instructions perform one or more operations. The one or more operations include receive the first and second image data sets of an anatomical structure of interest, register the first and second image data sets to the geometrical model of the anatomical structure of interest to form a registered image, and display the registered image on the display.

In an embodiment a tangible and non-transitory computer readable medium comprising one or more computer software modules is provided. The one or more computer software modules are configured to direct one or more processors to receive first and second image data sets of an anatomical structure of interest. The first image data set is associated with ultrasound imaging data and the second image data set is associated with a radiological image data. The one or more computer software modules are configured to direct one or more processors to register the first and second image data sets to a geometrical model of the anatomical structure of interest to form a registered image. The geometrical model includes a location of an anatomical marker. Additionally, the one or more computer software modules are configured to direct one or more processors to display the registered image, wherein the registered image includes a visualization of the anatomical markers.

DETAILED DESCRIPTION OF THE INVENTION

Figure 1A:
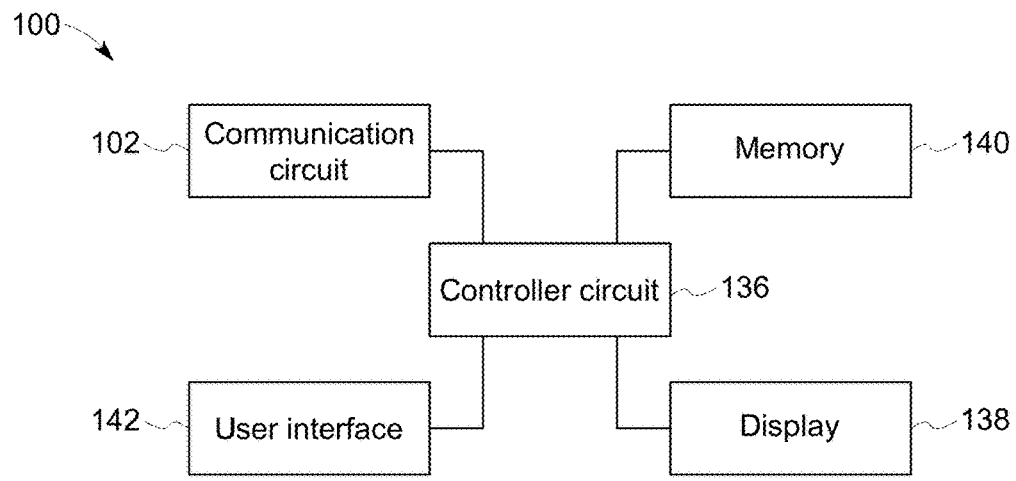
FIG. 1A illustrates a schematic block diagram of an embodiment of a multi-modal imaging system.

The following detailed description of certain embodiments will be better understood when read in conjunction with the appended drawings. To the extent that the figures illustrate diagrams of the functional modules of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments provide systems and methods for providing a visualization of a multi-modal medical image for diagnostic medical imaging. The multi-modal medical image may be generated by a images from two imaging systems, such as an ultrasound imaging system and a CT imaging system. The multi-modal medical image may represent an image registration of first and second image data sets by registering both to a common anatomical model. The first and second image data sets may have been acquired using different modalities. The first and second image data sets may represent two-dimensional image data, three-dimensional image data, and/or the like. For example, the first image data set may be associated with ultrasound imaging data. In another example, the second image data set may be associated with radiological image data (e.g., X-ray imaging system, a computed tomography (CT) imaging system, a magnetic resonance (MR) imaging system, positron emission tomography (PET) imaging system, and/or the like).

The geometrical model may be based on an anatomical structure of interest (e.g., brain, heart, bladder, kidney, liver, bone structure, vascular structure, organ, and/or the like). The geometrical model includes anatomical markers corresponding to structures, landmarks, and/or features of the anatomical structure of interest. For example, the anatomical structure of interest may be a heart. The anatomical markers may represent different chambers, valves, out-flow tracts, in-flow tracts, and/or the like. The geometrical model is parameterized such that the anatomical markers have fixed locations or coordinates of a parametric coordinate system. The parametric coordinate system enables the geometrical model to have a known and fixed relation to overall anatomical directions (e.g., superior-inferior, left-right, anterior-posterior, and/or the like) of the anatomical structure of interest.

The multi-modal imaging system is configured to register the first and second image data sets to the geometrical model. For example, the first and second image data sets are registered to the geometrical model. The multi-modal imaging system is configured to deform the geometrical model so that there is a correspondence between the anatomical structures in the model and each of the first and second image data set within a set non-zero predetermined threshold. Based on the parametric model coordinate system and the deformable registration between the geometrical model and each of the first and second image data set, the anatomical markers within the anatomical model may be mapped to corresponding field of views and/or slices of interest in the first and second image data sets. A clinician may select one or more field of views and/or slices of the multi-modal medical image to be shown on a display of the multi-modal imaging system. For example, the clinician may utilize a user interface to select a field of view (e.g. a three-chamber view) of the anatomical structure of interest.

Additionally or alternatively, the multi-modal medical image may include a view marker configured to indicate where the field of view within the anatomical structure of interest. Optionally, the multi-modal medical image may include first and second boundaries (e.g., bounding boxes) of the first and second image data sets, respectively. For example, the first and second boundaries may represent a boundary and/or end of the first and second image date sets.

A technical effect of at least one embodiment described herein reduces the amount of time for a clinician to select a field of view of the anatomical structure. A technical effect of at least one embodiment described herein enables implementation of the registration of a plurality of image data sets by the multi-modal medical imaging system, such as an ultrasound imaging system and a CT system, without the need for additional hardware and without integration to an X-ray system.

Figure 1B:
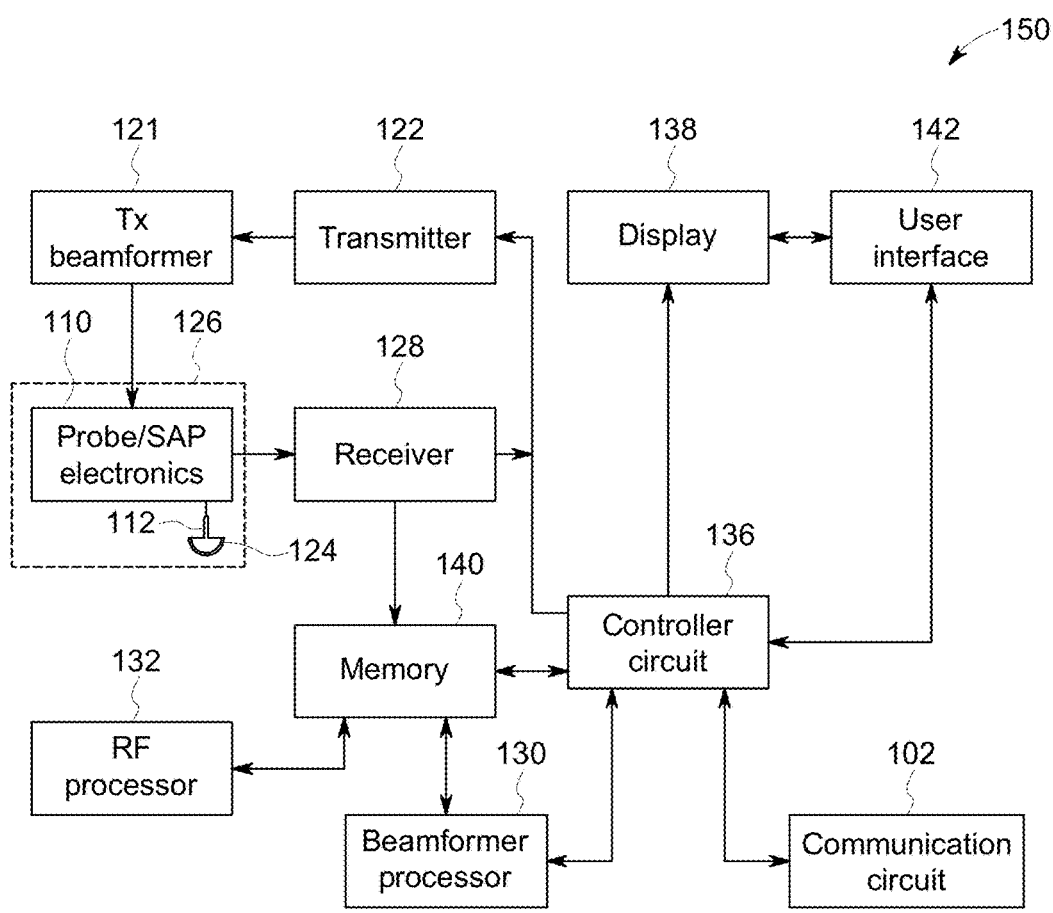
FIG. 1B illustrates a schematic block diagram of an embodiment of a multi-modal and diagnostic imaging system.

FIGS. 1A-B illustrate schematic block diagrams of embodiments of multi-modal imaging systems (MMIS) 100, 150. The MMIS 100 of FIG. 1A may include a controller circuit 136 operably coupled to a communication circuit 136, a display 138, a user interface 142 and a memory 140.

The communication circuit 136 may be communicatively coupled to one or more medical diagnostic imaging systems, alternative MMIS (e.g., the MMIS 150 shown in FIG. 1B), a remote server, and/or the like via corresponding bi-directional communication links. The one or more medical diagnostic imaging systems may include ultrasound imaging systems, nuclear medicine imaging systems (e.g., Positron Emission Tomography (PET) or Single Photon Emission Computed Tomography (SPECT) imaging systems), Magnetic Resonance (MR) imaging systems, Computed Tomography (CT) imaging devices, and/or x-ray imaging systems, and/or the like. The remote server may be configured to store image data sets from prior scanning and/or clinician sessions of a patient acquired by the one or more medical diagnostic imaging systems.

The bi-directional communication links may be a wired (e.g., via a physical conductor) and/or wireless communication (e.g., utilizing radio frequency (RF)) link for exchanging data (e.g., data packets) between the MMIS 100 and an alternative MMIS, the one or more medical diagnostic imaging systems, the remote server, and/or the like. For example, the MMIS 100 may receive a first and second image data sets (e.g., medical images) from saved scanning and/or clinician sessions from the alternative MMIS, the one or more medical diagnostic imaging systems, the remote server, and/or the like. The bi-directional communication links may be based on a standard communication protocol, such as Ethernet, TCP/IP, WiFi, 802.11, a customized communication protocol, and/or the like.

The controller circuit 136 is configured to control the operations of the MMIS 100. The controller circuit 136 may include one or more processors, a central controller circuit (CPU), one or more microprocessors, a graphics controller circuit (GPU), or any other electronic component capable of processing inputted data according to specific logical instructions. Optionally, the controller circuit 136 may include and/or represent one or more hardware circuits or circuitry that include, are connected with, or that both include and are connected with one or more processors, controllers, and/or other hardware logic-based devices. Additionally or alternatively, the controller circuit 136 may execute instructions stored on a tangible and non-transitory computer readable medium (e.g., the memory 140).

The controller circuit 136 may be operably coupled to and/or control a communication circuit 102. The communication circuit 102 is configured to receive and/or transmit information with the one or more medical diagnostic imaging systems, the alternative MMIS, the remote server, and/or the like. The communication circuit 102 may represent hardware that is used to transmit and/or receive data along the bi-directional communication links. The communication circuit 102 may include a transceiver, receiver, transceiver and/or the like and associated circuitry (e.g., antennas) for wired and/or wirelessly communicating (e.g., transmitting and/or receiving) with the one or more medical diagnostic imaging systems, the alternative MMIS, the remote server, and/or the like. For example, protocol firmware may be stored in the memory 140, which is accessed by the controller circuit 136. The protocol firmware provides the network protocol syntax for the controller circuit 136 to assemble data packets, establish and/or partition data received along the bi-directional communication links, and/or the like.

The controller circuit 136 is operably coupled to the display 138 and the user interface 142. The display 138 may include one or more liquid crystal displays (e.g., light emitting diode (LED) backlight), organic light emitting diode (OLED) displays, plasma displays, CRT displays, and/or the like. The display 138 may display patient information, one or more image data set stored in the memory 140 or currently being acquired and/or videos, components of a graphical user interface, measurements, diagnosis, treatment information, and/or the like received by the display 138 from the controller circuit 136.

Figure 6:
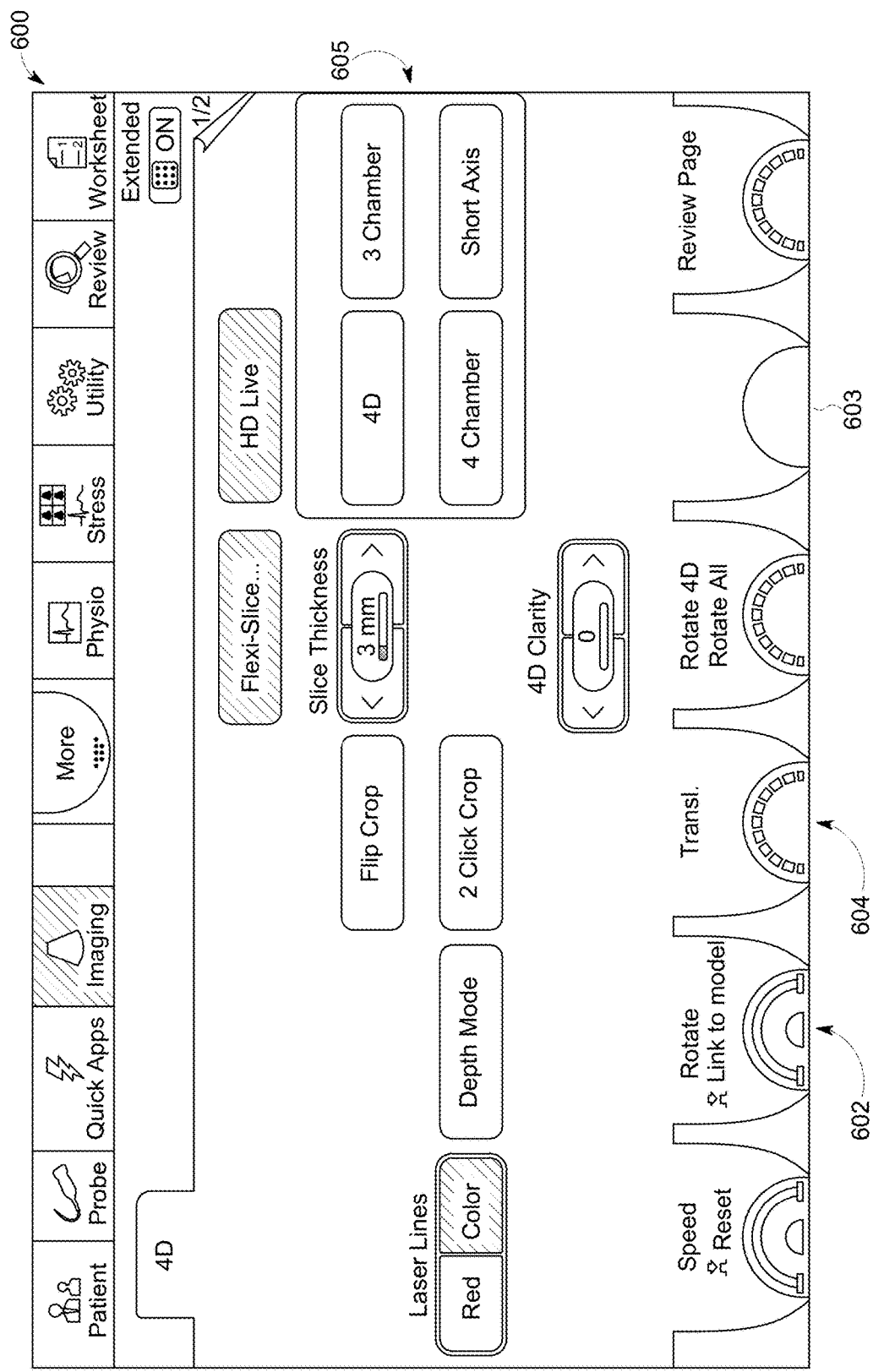
FIG. 6 illustrates an embodiment of a graphical user interface.

The user interface 142 controls operations of the controller circuit 136 and is configured to receive inputs from the user. The user interface 142 may include a keyboard, a mouse, a touchpad, one or more physical buttons, and/or the like. Optionally, the display 138 may be a touch screen display, which includes at least a portion of the user interface 142. For example, a portion of the user interface 142 may correspond to a graphical user interface (GUI) generated by the controller circuit 136 (e.g., as shown in FIG. 6), which is shown on the display 138. The touch screen display can detect a presence of a touch from the operator on the display 138 and can also identify a location of the touch with respect to a surface area of the display 138. For example, the user may select one or more user interface icons of the GUI shown on the display by touching or making contact with the display 138. The touch may be applied by, for example, at least one of an individual's hand, glove, stylus, or the like.

The memory 140 includes parameters, algorithms, models, data values, and/or the like utilized by the controller circuit 136 to perform one or more operations described herein. The memory 140 may be a tangible and non-transitory computer readable medium such as flash memory, RAM, ROM, EEPROM, and/or the like. The memory 140 may include a geometrical model and a registration algorithm configured to register one or more image data sets to the geometrical model. Additionally or alternatively, the geometrical model and/or the registration algorithm may be received along one of the bi-directional communication links via the communication circuit 102 and stored in the memory 140.

The geometrical model may be based on a machine learning algorithm (e.g., convolutional neural network algorithms, deep learning algorithms, decision tree learning algorithms, and/or the like), a user pre-defined model, and/or the like of an anatomical structure of interest (e.g., brain, heart, bladder, kidney, liver, bone structure, vascular structure, organ, and/or the like). The geometrical model may be defined with a parametric coordinate system such as a spline surface, allowing key anatomical markers in the model to have fixed co-ordinates in the parametric system, although the overall shape of the geometrical model may be expanded and deformed by the controller circuit 136. The initial shape of the geometric model, and the modes of deformation may be defined by a priori and/or learnt by utilizing a series of training images utilized by the machine learning algorithm, user guided selection database (e.g., true positives and true negatives corresponding to each anatomical marker within the parametric coordinate system). For example, the parametric coordinate system may define locations or coordinates of the anatomical structure of interest corresponding to one or more anatomical markers. The anatomical markers may represent structures (e.g., chambers, anatomical boundaries, tracts, apertures, and/or the like), landmarks (e.g., apex), and/or features of the anatomical structure of interest. For example, the anatomical structure of interest may be a heart. The parametric coordinate system of the geometrical model may define an apex of the left ventricle (e.g., an anatomical marker) as a coordinate of (0, 0) within the parametric coordinate system.

The registration algorithm executed by the controller circuit 136 is configured to register one or more image data sets to the parametric coordinate system of the geometrical model to form a registered image. The registration algorithm is based on registration techniques utilized to coalesce the one or more image data sets received by the MMIS 100 to the geometrical model.

Optionally, the registration algorithm may be configured to transform the one or more image data sets into one common coordinate system (e.g., the parametric coordinate system of the geometrical model), as described in U.S. Pat. No. 8,090,165, entitled "Method and system for visualizing registered images," which is incorporated by reference in its entirety. The controller circuit 136 (e.g., by executing the registration algorithm) may be configured to determine one or more suitable transformations that may be employed to transform the one or more image data sets to the parametric coordinate system based on the anatomical markers. In accordance with aspects of the present technique, the transform may include transforms, such as, but not limited to, rigid transforms, non-rigid transforms, or affine transforms. The rigid transforms may include, for example, translations, rotations or a combination thereof. Also, the non-rigid transforms may include finite element modeling (FEM), B-spline transforms, Daemon's (fluid flow based) methods, diffusion based methods, optic flow based methods, or level-set based methods, for example.

Additionally or alternatively, the registration algorithm is configured to identify one or more anatomical markers within the image data set and assign, align, and/or match to the anatomical markers defined by the parametric coordinate system. For example, the registration algorithm may be defined by a machine learning algorithm (e.g., convolutional neural network algorithms, deep learning algorithms, decision tree learning algorithms, and/or the like) utilizing a series of training images of the anatomical structure of interest. The anatomical markers may be identified by the machine learning algorithms based on features of the one or more anatomical structures (e.g., boundaries, thickness, and/or the like). The features may represent high level features of the pixels and/or voxels of the training images such as a histogram orient gradients, blob features, covariance features, binary pattern features, and/or the like. Optionally, the machine learning algorithm may define the registration algorithm by automatically building a statistical model and/or a database of true positives and true negatives corresponding to each anatomical marker identified based on the features from the training images, a classification model, supervised modeling, and/or the like.

For example, the registration algorithm may be configured and/or designed based on a plurality of training medical images. The plurality of training medical images may be grouped into different anatomical marker sets. Additionally or alternatively, the training medical images within each set may represent different orientations and/or views of the one or more anatomical markers. For example, a set of the training medical images may include over 50,000 images. For example, a set of the training medical images may include one or more different views corresponding to the heart (e.g., anatomical structure of interest). In another example, a second set of the training images may include one or more different views corresponding to the brain (e.g., anatomical structure of interest).

Additionally or alternatively, the registration algorithm may be defined based on a supervised learning method to identify the anatomical markers within the one or more image data sets. For example, a user (e.g., skilled medical practitioner) may manually label the one or more anatomical markers within the plurality of training medical images utilizing the user interface 142. The manually labeled medical images may be used to build a statistical model and/or a database of true positives and true negatives corresponding to each anatomical marker of the anatomical structure of interest defining the registration algorithm.

The registration algorithm may be defined to identify the one or more anatomical markers utilizing a classification model (e.g., random forest classifier). For example, the registration algorithm may be configured to identify the one or more anatomical markers based on a pixel level classifier model to label and/or assign each pixel of the medical image into a plurality of categories or classes (e.g., muscle, fat, background anatomy, anatomical structure of interest, chambers). The controller circuit 136 executing the classification model may determine the classes from a feature space of the pixels based from the various intensities and spatial positions of pixels within the image data set. The controller circuit 136 executing the registration algorithm may continually select a pixel of the first and second image data sets, and compare characteristics of the select pixel to feature vectors. For example, the controller circuit 136 may compare an intensity or brightness of the select pixel to feature vectors of the classification model. In another example, the controller circuit 136 may determine a variance kurtosis, skewness, or spatial distribution characteristic of the select pixel by comparing the intensity of the select pixel with adjacent and/or proximate pixels around the select pixel.

A number of characteristics of the select pixel is compared by the controller circuit 136 may be based on the feature sets included in the feature vectors. Each feature vector may be an n-dimensional vector that includes three or more features of pixels (e.g., mean, variance, kurtosis, skewness, spatial distribution) corresponding to a class (e.g., a background anatomy, muscle tissue, fat, the bladder) of pixels of anatomy within the first and second image data sets. The feature vectors of the classification model may be generated and/or defined by the controller circuit 136 based on a plurality of training medical images. For example, the controller circuit 136 may select pixel blocks from one hundred reference training medical images. The select pixel blocks may have a length of five pixels and a width of five pixels. For example, a plurality of pixels within each select pixel block may represent and/or correspond to one of the classes, such as tissue of the bladder. Based on the plurality of pixels within the select pixel blocks, the controller circuit 136 may generate and/or define a feature vector. The controller circuit 136 may determine feature sets for each pixel within the plurality of pixels of a select pixel block or more than one select pixel block corresponding to the same class. One of the feature sets may be based on an intensity histogram of the reference ultrasound images. For example, the controller circuit 136 may calculate a mean intensity of the plurality of pixels, a variance of the plurality of pixel intensities, a kurtosis or shape of intensity distribution of the plurality of pixels, a skewness of the plurality of pixels, and/or the like.

Additionally, one of the feature sets may correspond to a position or spatial feature of the pixels within the select pixel block. A spatial position with respect to a positon within the reference image (e.g., central location) and a depth with respect to an acquisition depth within the patient. The controller circuit 136 may perform a k-means clustering and/or random forest classification on the feature sets to define feature values that correspond to the class of the select pixel blocks. The controller circuit 136 may define a feature vector corresponding to the class based on the feature values to the classification model. The controller circuit 136 may assign a class to the select pixel based on a corresponding feature vector. When the select pixel is assigned a class, the controller circuit 136 may repeat the classification model to the remaining pixels of the first and second image data sets to identify the anatomical markers.

It may be noted that the machine learning algorithms utilized to define the registration algorithm are examples, additional methods are available for a person of ordinary skill in the art. In an embodiment, the controller circuit 136 may be configured to deform the geometrical model as described in U.S. Patent Publication No. 2010/0195881, entitled "Method and apparatus for automatically identifying image views in a 3d dataset," which is incorporated herein in its entirety by reference. For example, the controller circuit 136 may deform the geometrical model based on a Kalman filter.

In connection with FIG. 1B, the MMIS 150 may be integrated with and/or a part of a medical diagnostic imaging system, such as an ultrasound imaging system. For example, the MMIS 150 may be configured to acquire at least one of the image data sets. The MMIS 150 includes an ultrasound probe 126 having a transmitter 122, transmit beamformer 121 and probe/SAP electronics 110. The probe/SAP electronics 110 may be used to control the switching of the transducer elements 124. The probe/SAP electronics 110 may also be used to group transducer elements 124 into one or more sub-apertures.

The ultrasound probe 126 may be configured to acquire ultrasound data or information from the anatomical structure of interest of the patient based on the predetermined settings. The ultrasound probe 126 is communicatively coupled to the controller circuit 136 via the transmitter 122. The transmitter 122 transmits a signal to a transmit beamformer 121 based on acquisition settings received by the controller circuit 136. The acquisition settings may define an amplitude, pulse width, frequency, gain setting, scan angle, power, time gain compensation (TGC), resolution, and/or the like of the ultrasonic pulses emitted by the transducer elements 124. The transducer elements 124 emit pulsed ultrasonic signals into a patient (e.g., a body). Optionally, the acquisition settings may be defined by the user utilizing the user interface 142. The signal transmitted by the transmitter 122 in turn drives a plurality of transducer elements 124 within a transducer array 112.

The transducer elements 124 emit pulsed ultrasonic signals into a body (e.g., patient) or volume corresponding to the acquisition settings along one or more scan planes. The ultrasonic signals may include, for example, one or more reference pulses, one or more pushing pulses (e.g., shear-waves), and/or one or more pulsed wave Doppler pulses. At least a portion of the pulsed ultrasonic signals backscatter from the anatomical structure of interest to produce echoes. The echoes are delayed in time and/or frequency according to a depth or movement, and are received by the transducer elements 124 within the transducer array 112. The ultrasonic signals may be used for imaging, for generating and/or tracking shear-waves, for measuring changes in position or velocity within the anatomic structure, differences in compression displacement of the tissue (e.g., strain), and/or for therapy, among other uses. For example, the probe 126 may deliver low energy pulses during imaging and tracking, medium to high energy pulses to generate shear-waves, and high energy pulses during therapy.

The transducer elements 124 convert the received echo signals into electrical signals which may be received by a receiver 128. The receiver 128 may include one or more amplifiers, an analog to digital converter (ADC), and/or the like. The receiver 128 may be configured to amplify the received echo signals after proper gain compensation and convert these received analog signals from each transducer element 124 to digitized signals sampled uniformly in time. The digitized signals representing the received echoes are stored in memory 140, temporarily. The digitized signals correspond to the backscattered waves receives by each transducer element 124 at various times. After digitization, the signals still may preserve the amplitude, frequency, phase information of the backscatter waves.

Optionally, the controller circuit 136 may retrieve the digitized signals stored in the memory 140 to prepare for the beamformer processor 130. For example, the controller circuit 136 may convert the digitized signals to baseband signals or compressing the digitized signals.

The beamformer processor 130 may include one or more processors. Optionally, the beamformer processor 130 may include a central controller circuit (CPU), one or more microprocessors, or any other electronic component capable of processing inputted data according to specific logical instructions. Additionally or alternatively, the beamformer processor 130 may execute instructions stored on a tangible and non-transitory computer readable medium (e.g., the memory 140) for beamforming calculations using any suitable beamforming method such as adaptive beamforming, synthetic transmit focus, aberration correction, synthetic aperture, clutter reduction and/or adaptive noise control, and/or the like. Optionally, the beamformer processor 130 may be integrated with and/or apart of the controller circuit 136. For example, the operations described being performed by the beamformer processor 130 may be configured to be performed by the controller circuit 136.

The beamformer processor 130 performs beamforming on the digitized signals of transducer elements and outputs a radio frequency (RF) signal. The RF signal is then provided to an RF processor 132 that processes the RF signal. The RF processor 132 may include one or more processors. Optionally, the RF processor 132 may include a central controller circuit (CPU), one or more microprocessors, or any other electronic component capable of processing inputted data according to specific logical instructions. Additionally or alternatively, the RF processor 132 may execute instructions stored on a tangible and non-transitory computer readable medium (e.g., the memory 140). Optionally, the RF processor 132 may be integrated with and/or apart of the controller circuit 136. For example, the operations described being performed by the RF processor 132 may be configured to be performed by the controller circuit 136.

The RF processor 132 may generate different ultrasound image data types, e.g. B-mode, color Doppler (velocity/power/variance), tissue Doppler (velocity), and Doppler energy, for multiple scan planes or different scanning patterns based on the predetermined settings of the first model. For example, the RF processor 132 may generate tissue Doppler data for multi-scan planes. The RF processor 132 gathers the information (e.g. I/Q, B-mode, color Doppler, tissue Doppler, and Doppler energy information) related to multiple data slices and stores the data information, which may include time stamp and orientation/rotation information, in the memory 140.

Alternatively, the RF processor 132 may include a complex demodulator (not shown) that demodulates the RF signal to form IQ data pairs representative of the echo signals. The RF or IQ signal data may then be provided directly to the memory 140 for storage (e.g., temporary storage). Optionally, the output of the beamformer processor 130 may be passed directly to the controller circuit 136.

The controller circuit 136 may be configured to adjust the system settings, image presentation settings, and/or anatomical structures represented by the ultrasound data and/or ultrasound images acquired by the MMIS 150. For example, the controller circuit 136 may be configured to process the acquired ultrasound data (e.g., RF signal data or IQ data pairs) and prepare and/or generate frames of ultrasound image data (e.g., image data sets) representing the anatomical structure of interest for display on the display 138. Acquired ultrasound data may be processed in real-time by the controller circuit 136 during a scanning or therapy session as the echo signals are received. Additionally or alternatively, the ultrasound data may be stored temporarily in the memory 140 during a scanning session and processed in less than real-time in a live or off-line operation.

The memory 140 may be used for storing processed frames of acquired ultrasound data that are not scheduled to be displayed immediately or to store post-processed images (e.g., shear-wave images, strain images), firmware or software corresponding to, for example, a graphical user interface, one or more default image display settings, programmed instructions, and/or the like. The memory 140 may store 3D ultrasound image data sets of the ultrasound data, where such 3D ultrasound image data sets are accessed to present 2D and 3D images. For example, a 3D ultrasound image data set may be mapped into the corresponding memory 140, as well as one or more reference planes. The processing of the ultrasound data, including the ultrasound image data sets, may be based in part on user inputs, for example, user selections received at the user interface 142.

The controller circuit 136 is operably coupled to a display 138 and a user interface 142. The display 138 may include one or more liquid crystal displays (e.g., light emitting diode (LED) backlight), organic light emitting diode (OLED) displays, plasma displays, CRT displays, and/or the like. The display 138 may display patient information, ultrasound images and/or videos, components of a display interface, one or more 2D, 3D, or 4D ultrasound image data sets from ultrasound data stored in the memory 140 or currently being acquired, measurements, diagnosis, treatment information, and/or the like received by the display 138 from the controller circuit 136.

The user interface 142 controls operations of the controller circuit 136 and is configured to receive inputs from the user. The user interface 142 may include a keyboard, a mouse, a touchpad, one or more physical buttons, and/or the like. Optionally, the display 138 may be a touch screen display, which includes at least a portion of the user interface 142. For example, a portion of the user interface 142 may correspond to a graphical user interface (GUI) generated by the controller circuit 136 shown on the display. The GUI may include one or more user interface components (e.g., user interface components 602-605 shown in FIG. 6) that may be selected, manipulated, and/or activated by the user operating the user interface 142 (e.g., touch screen, keyboard, mouse). The user interface components may be presented in varying shapes and colors, such as a graphical or selectable icon, a slide bar, a cursor, and/or the like. Optionally, one or more user interface components may include text or symbols, such as a drop-down menu, a toolbar, a menu bar, a title bar, a window (e.g., a pop-up window) and/or the like. Additionally or alternatively, one or more user interface components may indicate areas within the GUI for entering or editing information (e.g., patient information, user information, diagnostic information), such as a text box, a text field, and/or the like.

In various embodiments, the user interface components may perform various functions when selected, such as measurement functions, editing functions, database access/search functions, diagnostic functions, controlling acquisition settings, selection of different field of views of the registered image, placement of reference markers indicating a point of interest within the registered image, and/or system settings for the ultrasound imaging system 100 performed by the controller circuit 136.

Figure 2:
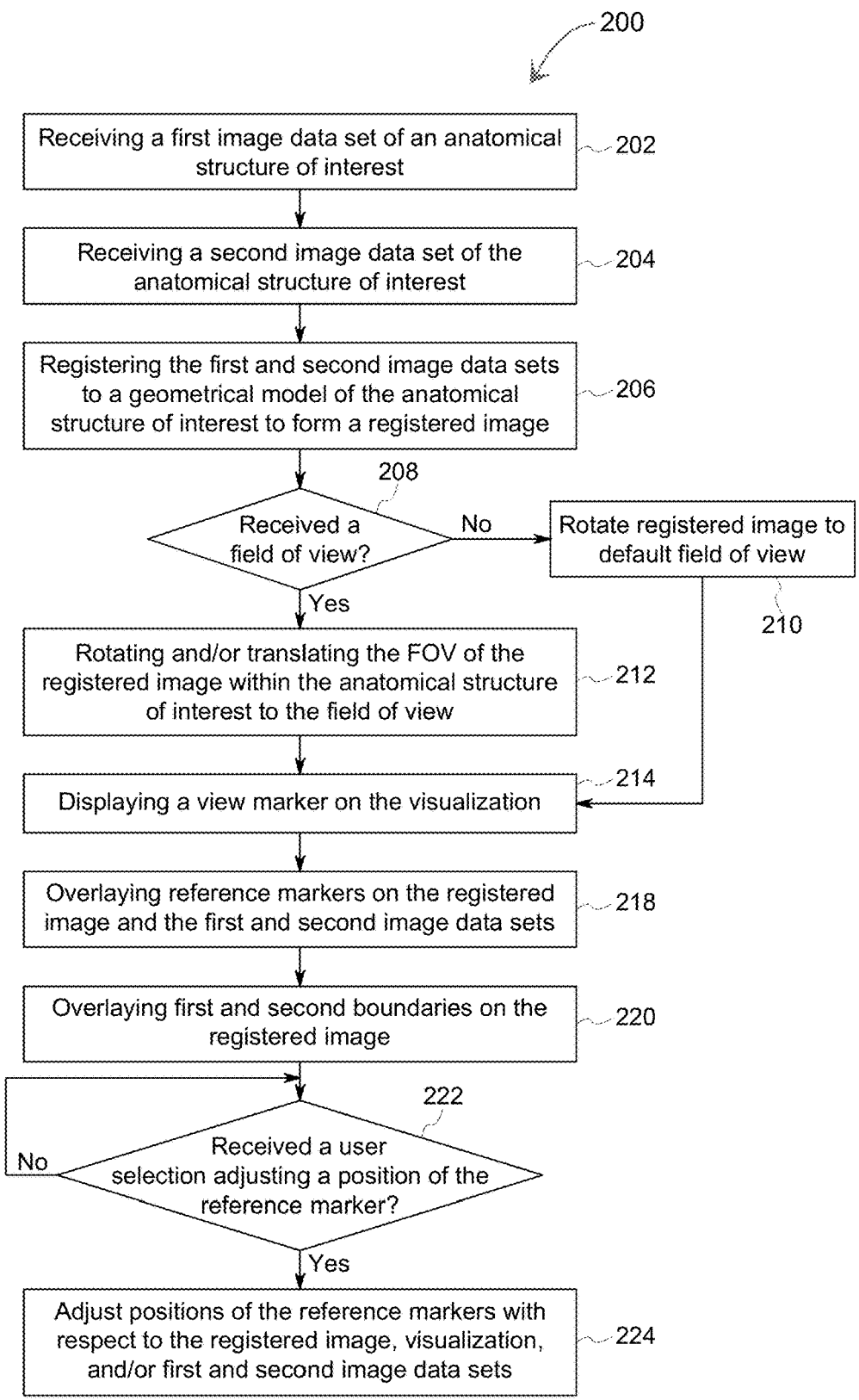
FIG. 2 illustrates a flowchart of an embodiment of a method for registration of multi-modal images.

FIG. 2 illustrate a flowchart of an embodiment of a method 200 for multi-modal imaging. The method 200, for example, may employ structures or aspects of various embodiments (e.g., systems and/or methods) discussed herein. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 200 may be used as one or more algorithms to direct hardware to perform one or more operations described herein. It should be noted, other methods may be used, in accordance with embodiments herein.

Figure 3:
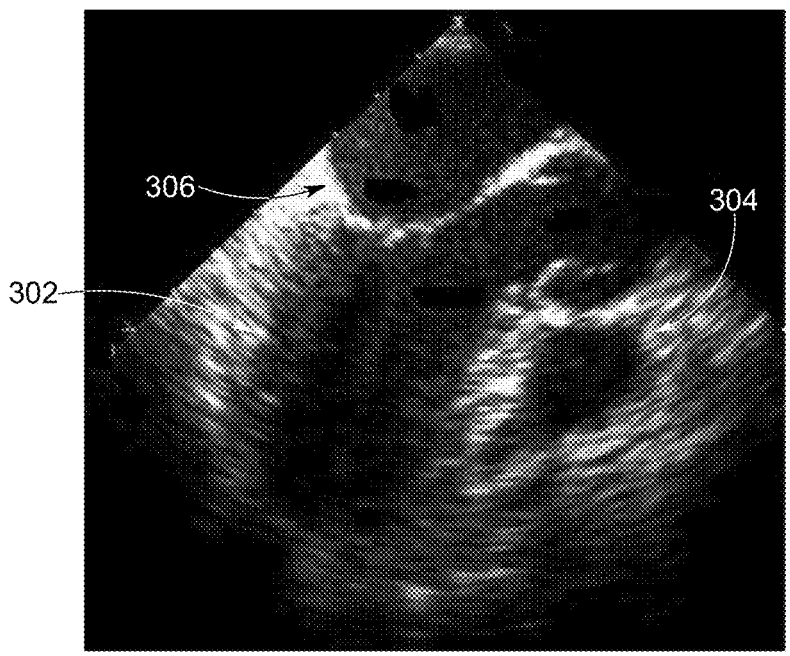
FIG. 3 illustrates an embodiment of a first image data set.

Beginning at 202, the controller circuit 136 may be configured to receive a first image data set 300 of the anatomical structure of interest. FIG. 3 illustrates an embodiment of a first image data set 300. The first image data set 300 is of a heart representing the anatomical structure of interest. The first image data set 300 may include a plurality of anatomical markers, such as the chambers 302, 304, and 306. In connection with FIGS. 1A-B, the controller circuit 136 may receive the first image data set 300 along the bi-directional communication link of the communication circuit 102 and/or within the memory 140. For example, the controller circuit 136 may receive the first image data set 300 from a remote server, a medical diagnostic imaging system, and/or the like along the bi-directional communication link.

In another example, in connection with FIG. 1B, the controller circuit 136 may receive the first image data set 300 based on image data received from the ultrasound probe 126. The first image data set 300 may be associated with and/or be based on ultrasound imaging data. The controller circuit 136 may collect ultrasound data along an imaging plane of the ultrasound probe 126 for the anatomical structure of interest. The transducer elements 124 of the ultrasound probe 126 may emit ultrasonic pulses over a period of time based on the ultrasound acquisition settings. At least a portion of the ultrasonic pulses are backscattered by the tissue of the anatomical structure of interest and received by the receiver 128, which converts the received echo signals into digitized signals. The digitized signals, as described herein, are beamformed by the beamformer processor 130 and formed into IQ data pairs (e.g., the ultrasound data) representative of the echo signals by the RF processor 132. The digitized signals are beamformed by the beamformer processor 130, and output the RF signal processed to the RF processor 132. The processed RF signals are stored as ultrasound data in the memory 140, which is acquired and received by the controller circuit 136. The ultrasound data may be stored in the memory as pixels for the first image data set 300 of the anatomical structure of interest. It may be noted, that the first image data set 300 may be received in real-time as the ultrasound probe 126 acquires the ultrasound data.

Figure 4:
FIG. 4 illustrates an embodiment of a second image data set.

At 204, the controller circuit 136 may be configured to receive a second image data set 400 of the anatomical structure of interest. FIG. 4 illustrates an embodiment of the second image data set 400. The second image data set 400 may have been acquired utilizing a different modality relative to the first image data set 300. For example, the second image data set 400 may be associated with and/or based on radiological image data. The second image data set 400 may have been acquired using a medical diagnostic imaging system, such as an X-ray imaging system, a computed tomography (CT) imaging system, a magnetic resonance (MR) imaging system, positron emission tomography (PET) imaging system, and/or the like. The controller circuit 136 may receive the second image date set 400 via the bi-directional communication link 102 and/or stored in the memory 140. The second image data set 400 is of a heart representing the anatomical structure of interest. The second image data set 400 may include a plurality of anatomical markers, such as the chambers 402, 404, and 406.

It may be noted that the first and second image data sets 300, 400 may temporally different. For example, the second image data set 400 may have been acquired from the patient prior to and/or after the first image data set 300 was acquired. Additionally or alternatively, the first and second image data sets 300, 400 may have been acquired concurrently.

Figure 5:
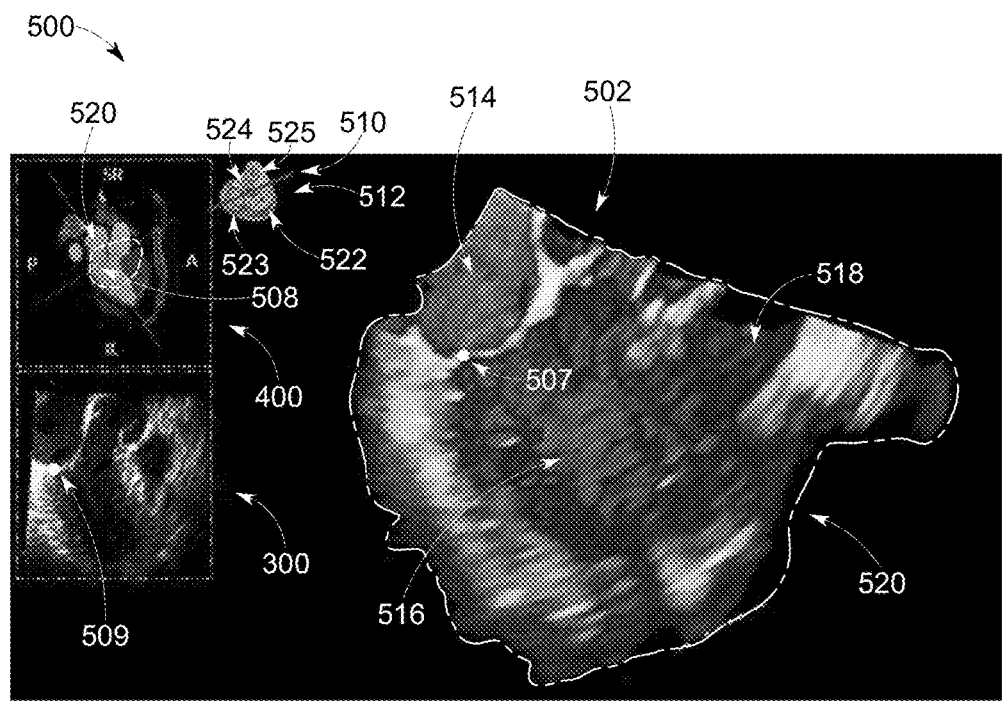
FIG. 5 illustrates an embodiment of a registered image.

At 206, the controller circuit 136 may be configured to register the first and second image data sets 300, 400 to the geometrical model of the anatomical structure of interest to form a registered image 502 (FIG. 5). For example, the controller circuit 136 may execute the registration algorithm stored in the memory 140. Based on the registration algorithm, the controller circuit 136 may identify the anatomical markers 302, 304, 306, 402, 404, 406 within the first and second image data sets 300, 400. For example, the controller circuit 136 may identify the anatomical markers 302, 304, 306, 402, 404, 406 based on the classification model of the executed registration algorithm. The controller circuit 136 may identify the anatomical markers 302, 304, 306, 402, 404, 406 and assign the anatomical markers 302, 304, 306, 402, 404, 406 with coordinates based on the parametric coordinate system defined by the geometrical model. It may be noted that the controller circuit 136 may identify the anatomical markers 302, 304, 306, 402, 404, 406 of the first and second image data sets 300, 400 separately and/or concurrently (e.g., simultaneously).

In connection with FIG. 5, the controller circuit 136 by executing the registration algorithm forms the registered image 502. The registered image 502 includes the first and second image data sets 300, 400 having the anatomical marks 302, 304, 306, 402, 404, 406 aligned with the parametric coordinate system of the geometrical model.

FIG. 5 illustrates an embodiment 500 of the registered image 502. The registered image 502 may be shown on the display 138. The registered image 502 may include anatomical markers 514, 516, 518 corresponding to at least a portion of the anatomical markers 302, 304, 306, 402, 404, 406 of the first and second image data sets 300, 400. The embodiment 500 may include the registered image 502 and a visualization 512. For example, the visualization 512 may be shown concurrently with the registered image 502 on the display 138. The visualization 512 may represent the geometrical model. Additionally, the visualization 512 includes the anatomical markers 522-525 of the anatomical structure of interest identified by the geometrical model. Optionally, the first and second data image data sets 300, 400 may be displayed concurrently with the registered image 502 on the display 138.

At 208, the controller circuit 136 may determine whether a field of view (FOV) was received. For example, the FOV may represent a plane within the anatomical structure of interest corresponding to the registered image 502. The FOV may be received by the controller circuit 136 by the user interface 142. In connection with FIG. 6, the controller circuit 136 may receive the FOV based on selections by the clinician from a graphical user interface (GUI) 600 shown on the display 138.

FIG. 6 illustrates an embodiment of the GUI 600. The GUI 600 includes a plurality of user interface components 602-605. The user interface components 602-605 may represent graphical icons, text entry spaces, and/or the like configured to allow the clinician to select a system function, manipulate the registered image 502, enter information, and/or the like. For example, the user interface component 602 may be configured to rotate the FOV of the registered image 502 about one or more axes of the anatomical structure of interest. In another example, the user interface component 604 may be configured to translate and/or traverse the FOV of along one or more axes of the anatomical structure of interest. In another example, the user interface component 603 may be configured to increase a thickness of the FOV. In another example, the user interface component 605 may be configured to set predefined view and/or cut-plane through the registered image 502

If the FOV was not received, then at 210, the controller circuit 136 may be configured to rotate the registered image 502 to a default FOV. The default FOV may correspond to a default orientation (e.g., superior-inferior, left-right, anterior-posterior) of the registered image 502 stored in the memory 140. For example, the controller circuit 136 registered the first and second image data sets 300, 400 to the geometrical model. The parametric coordinate system of the geometrical model includes known and fixed relations to overall anatomical directions of the anatomical structure, which enables the rotation and/or translation of the FOV within the anatomical structure of interest. When the registered image 502 is rotated to the default FOV, the controller circuit 136 is configured to instruct the registered image 502 to be displayed on the display 138.

The default FOVs may be stored in the memory 140. For example, the memory 140 may include a default FOV database that includes anatomical structures of interest matched with corresponding default FOVs. In an embodiment, the anatomical structure of interest may be the heart. The controller circuit 136 may set the default FOV to the four chamber view of the heart. In another example, the default FOV database may be based on the scan being performed by the clinician matched with corresponding default FOVs.

If the FOV was received, then at 212, the controller circuit 136 may be configured to rotate and/or translate the FOV of the registered image 502 within the anatomical structure of interest. For example, the controller circuit 136 may rotate and/or translate the FOV of the registered image 502 based on the selections by the clinician utilizing the user interface 142. The rotation and/or translation of the registered image 502 corresponding to the FOV within the anatomical structure of interest may be determined by the controller circuit 136 by adjusting the parametric coordinate system. For example, the anatomical markers 514, 516, 518 of the registered image 502 have fixed locations (e.g., coordinates) of the parametric coordinate system of the geometrical mode. The rotation of the registered image 502 corresponding to the rotation of the FOV is generated by the controller circuit 136 by rotating the parametric coordinate system based on the user selection received from the user interface 142. For example, the rotation and/or translation of the FOV may be based on the selection of the user interface components 602 and 604 of the GUI 600 shown in FIG. 6. When the registered image 502 is rotated to the received FOV, the controller circuit 136 is configured to instruct the registered image 502 to be displayed on the display 138.

At 214, the controller circuit 136 may display a view marker 510 on the visualization 512. The view marker 510 may indicate a position and/or orientation of the FOV within the anatomical structure of interest. For example, as the FOV is rotated and/or translated within the anatomical structure of interest, the controller circuit 136 may continually and/or intermittently update and/or revise a position of the view marker 510 with respect to the visualization 512.

At 218, the controller circuit 136 may overlay reference markers 507-509 on the registered image 502 and the first and second image data sets 300, 400. The reference markers 507-509 may correspond to a user structure of interest within the anatomical structure of interest. For example, the clinician may place the reference marker 507 on the registered image 502 utilizing the user interface 142 (e.g., the GUI 600). The controller circuit 136 may overlay the reference marker 507 on the registered image 502. Additionally or alternatively, the controller circuit 136 may determine a coordinate of the reference marker 507 relative to the parametric coordinate system. Based on the coordinate, the controller circuit 136 may overlay the reference markers 508-509 on the first and second image data sets 300, 400, respectively.

At 220, the controller circuit 136 may overlay first and second boundaries on the registered image. The first and second boundaries may be based on the first and second image data sets 300, 400, respectively. For example, the first and second boundaries may represent edges (e.g., boundary boxes) and/or portions of the first and second image data sets 300, 400 that does not include data of the anatomical structure of interest.

As show in FIG. 5, a first boundary 520 based on the first image data set 300 is shown. Outside of the first boundary 520, the registered image 502 only includes information of the second image data set 400. Within the first boundary 520, the registered image 502 include information of the first and second image data sets 300, 400. Additionally or alternatively, the first and second boundaries may be overlaid on the first and second image data sets 300, 400. For example, the second image data set 400 includes the first boundary 520.

At 222, the controller circuit 136 may determine whether a user selection adjusts a position of at least one of the reference markers 507-509 is received. For example, the controller circuit 136 may monitor the user interface 142 for an adjustment of at least one of the anatomical markers 302, 304, 306.

If the user selection is received, then at 224, the controller circuit 136 may be configured to adjust positions of the reference markers 507-509 with respect to the registered image 502, visualization 512, and/or the first and second image data sets 300, 400. For example, the controller circuit 136 may receive an adjustment of the reference marker 507 based on user selection received from the user interface 142. The controller circuit 136 may reposition the reference marker 507 based on the user selection. Based on the coordinate of the adjusted reference marker, the controller circuit 136 may adjust a position of the reference markers 508-509 of the first and second image data sets 300, 400 to match the coordinate of the adjusted reference marker.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid-state drive, optical disk drive, and the like. The storage device may also be other similar means for loading computer programs or other instructions into the computer or processor.

As used herein, the term "computer," "subsystem," "circuit," "controller circuit," or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer," "subsystem," "circuit," "controller circuit," or "module".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a controller circuit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f) unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A method for multi-modal imaging, the method comprising:
   receiving first and second image data sets of an anatomical structure of interest of a patient, the first and second image data sets generated by scanning the patient;
   identifying an anatomical marker in each of the first and second image data sets, the anatomical marker representing a feature of the anatomical structure of interest;
   registering the first and second image data sets to a geometrical model of the anatomical structure of interest within a parametric coordinate system to form a registered image, wherein the geometrical model is a generic representation of the anatomical structure of interest and is not based on information specific to the patient, the geometrical model including a location of a reference anatomical marker within the parametric coordinate system, the reference anatomical marker being associated with the anatomical marker identified in each of the first and second image data sets, wherein the registering operation includes aligning the anatomical marker in each of the first and second image data sets to the location of the reference anatomical marker in the parametric coordinate system; and
   displaying the registered image.

2. The method for multi-modal imaging of claim 1, further comprising concurrently displaying the first image data set, the second image data set, and the registered image.

3. The method for multi-modal imaging of claim 2, further comprising overlaying user-selected reference markers on the registered image and the first and second image data sets, and adjusting positions of the user-selected reference markers based on user selections.

4. The method for multi-modal imaging of claim 1, further comprising receiving a field of view of the anatomical structure of interest from a user interface, the field of view representing a plane within the geometrical model, and rotating the parametric coordinate system based on the field of view that is received to modify the registered image that is displayed.

5. The method for multi-modal imaging of claim 4, further comprising concurrently displaying the registered image with a visualization representing the geometrical model, and displaying a view marker on the visualization, wherein the view marker represents the field of view with respect to the visualization.

6. The method for multi-modal imaging of claim 1, further comprising overlaying first and second boundaries on the registered image, wherein the first boundary is based on the first image data set and the second boundary is based on the second image data set.

7. The method for multi-modal imaging of claim 1, wherein the first image data set is associated with ultrasound imaging data.

8. The method for multi-modal imaging of claim 1, wherein the second image data set is associated with a radiological image data.

9. The method for multi-modal imaging of claim 1, wherein the receiving operation includes receiving the first image data set from an ultrasound imaging system that generated the first image data set and receiving the second image data set from a nuclear medicine imaging system that generated the second image data set.

10. The method for multi-modal imaging of claim 1, wherein the registering operation is automatically performed by one or more processors according to a machine learning algorithm designed based on a plurality of training medical images depicting the anatomical structure of interest.

11. A multi-modal imaging system comprising:
    a display;
    a memory configured to store first and second image data sets of an anatomical structure of interest of a patient and a geometrical model of the anatomical structure of interest, wherein the first and second image data sets are generated by scanning the patient, wherein the geometrical model is a generic representation of the anatomical structure of interest and is not based on information specific to the patient, the geometrical model including a location of a reference anatomical marker within a parametric coordinate system;
    one or more processors configured to execute programmed instructions stored in the memory, wherein the one or more processors when executing the programmed instructions perform the following operations:
    receive the first and second image data sets of the anatomical structure of interest;
    identify an anatomical marker in each of the first and second image data sets, the anatomical marker representing a feature of the anatomical structure of interest;
    register the first and second image data sets to the geometrical model of the anatomical structure of interest to form a registered image, wherein the reference anatomical marker is associated with the anatomical marker identified in each of the first and second image data sets, and the first and second image data sets are registered to the geometrical model by aligning the anatomical marker in each of the first and second image data sets to the location of the reference anatomical marker in the parametric coordinate system; and
    display the registered image on the display.

12. The multi-modal imaging system of claim 11, wherein the one or more processors are further configured to perform the following operation of concurrently displaying the first image data set, the second image data set, and the registered image.

13. The multi-modal imaging system of claim 12, further comprising a user interface operably coupled to the one or more processors, wherein the one or more processors are further configured to perform the following operations of overlaying user-selected reference markers on the registered image and the first and second image data sets, and adjusting positions of the user-selected reference markers based on user selections received from the user interface.

14. The multi-modal imaging system of claim 11, further comprising a user interface operably coupled to the one or more processors, wherein the one or more processors are further configured to perform the following operation of receiving a field of view of the anatomical structure of interest from the user interface, the field of view representing a plane within the geometrical model, and rotating the parametric coordinate system based on the field of view that is received to modify the registered image that is displayed.

15. The multi-modal imaging system of claim 14, wherein the one or more processors are further configured to perform the following operation of concurrently displaying the registered image with a visualization representing the geometrical model, and displaying a view marker on the visualization, wherein the view marker represents the field of view with respect to the visualization.

16. The multi-modal imaging system of claim 11, wherein the one or more processors are further configured to perform the following operation of overlaying first and second boundaries on the registered image, wherein the first boundary is based on the first image data set and the second boundary is based on the second image data set.

17. The multi-modal imaging system of claim 11, wherein the first image data set is associated with ultrasound imaging data.

18. The multi-modal imaging system of claim 11, wherein the second image data set is associated with a radiological image data.

19. A tangible and non-transitory computer readable medium comprising one or more computer software modules configured to direct one or more processors to:
receive first and second image data sets of an anatomical structure of interest of a patient, wherein the first image data set represents ultrasound imaging data generated by scanning the patient with an ultrasound imaging system and the second image data set represents radiological image data generated by scanning the patient with a nuclear medicine imaging system;
identify an anatomical marker in each of the first and second image data sets, the anatomical marker representing a feature of the anatomical structure of interest;
register the first and second image data sets to a geometrical model of the anatomical structure of interest within a parametric coordinate system to form a registered image, wherein the geometrical model is a generic representation of the anatomical structure of interest and is not based on information specific to the patient, the geometrical model including a location of a reference anatomical marker within the parametric coordinate system, the reference anatomical marker being associated with the anatomical marker identified in each of the first and second image data sets, wherein the first and second image data sets are registered to the geometrical model by aligning the anatomical marker in each of the first and second image data sets to the location of the reference anatomical marker in the parametric coordinate system; and
display the registered image.

20. The tangible and non-transitory computer readable medium of claim 19, wherein the one or more processors are further directed to:
assign a coordinate in the parametric coordinate system to the anatomical marker in each of the first and second image data sets after registering the first and second image data sets to the geometrical model.

* * * * *